US007921183B2

(12) United States Patent
Kawamura

(10) Patent No.: US 7,921,183 B2
(45) Date of Patent: Apr. 5, 2011

(54) COMMUNICATION SYSTEM, STORAGE DEVICE, AND CONTROL DEVICE FOR ACCESSING EXTERNAL FILE DATA ON A PAGE UNIT OR SECTOR UNIT BASIS

(75) Inventor: Hirofumi Kawamura, Kanagawa (JP)

(73) Assignee: Sony Corporation (JP)

(*) Notice: Subject to any disclaimer, the term of this patent is extended or adjusted under 35 U.S.C. 154(b) by 123 days.

(21) Appl. No.: 11/280,766

(22) Filed: Nov. 16, 2005

(65) Prior Publication Data

US 2006/0123093 A1 Jun. 8, 2006

(30) Foreign Application Priority Data

Nov. 18, 2004 (JP) ................ P2004-334005

(51) Int. Cl.
*G06F 13/00* (2006.01)
(52) U.S. Cl. ........ 709/217; 711/154; 711/103; 711/112; 455/41.2; 455/42; 455/43; 455/39; 455/277.1
(58) Field of Classification Search .................. 711/103, 711/112, 154; 455/41.2, 42, 43, 39, 277.1; 709/217
See application file for complete search history.

(56) References Cited

U.S. PATENT DOCUMENTS

| 6,486,769 | B1* | 11/2002 | McLean ................ 340/10.32 |
| 6,513,095 | B1* | 1/2003 | Tomori .................... 711/103 |
| 7,260,417 | B2* | 8/2007 | El-Batal et al. ........... 455/552.1 |
| 7,260,423 | B2* | 8/2007 | Richardson et al. .......... 455/572 |
| 7,769,867 | B2* | 8/2010 | Fukuda ..................... 348/231.9 |
| 2003/0041284 | A1* | 2/2003 | Mambakkam et al. ......... 714/15 |
| 2003/0065899 | A1 | 4/2003 | Gorobets |
| 2003/0177300 | A1* | 9/2003 | Lee et al. .................... 711/103 |
| 2004/0001453 | A1* | 1/2004 | Kawai et al. ................. 370/311 |
| 2004/0092231 | A1* | 5/2004 | Ayatsuka et al. ........... 455/41.2 |
| 2004/0199712 | A1* | 10/2004 | Garritsen et al. ............ 711/103 |
| 2005/0015557 | A1* | 1/2005 | Wang et al. .................. 711/154 |
| 2005/0172074 | A1* | 8/2005 | Sinclair ........................ 711/114 |
| 2005/0251597 | A1* | 11/2005 | Zhang ............................ 710/74 |
| 2006/0010270 | A1* | 1/2006 | Zhang ............................ 710/74 |
| 2006/0020744 | A1* | 1/2006 | Sinclair et al. ................ 711/103 |

(Continued)

FOREIGN PATENT DOCUMENTS

EP 0473981 3/1992

(Continued)

OTHER PUBLICATIONS

Communications from EP Application 05025211, dated Nov. 29, 2010.

*Primary Examiner* — Hong Kim
(74) *Attorney, Agent, or Firm* — Lerner, David, Littenberg, Krumholz & Mentlik, LLP

(57) ABSTRACT

A communication system includes a storage device having a storage area accessed in one of a page unit and a sector unit; a control device operable to request access to data in a file unit; and a predetermined transmission line for transmitting data between the storage device and the control device. The control device transmits to the storage device via the transmission line a request for access to one of each page and each sector forming a file for which access has been requested, and the storage device sequentially accesses one of a requested page and a requested sector, whereby a request for access to the entire file is realized in the storage area.

16 Claims, 16 Drawing Sheets

U.S. PATENT DOCUMENTS

2006/0039221 A1 * 2/2006 Fukuda .................... 365/222
2006/0046655 A1 * 3/2006 Terashima ................ 455/41.2

FOREIGN PATENT DOCUMENTS

| | | | |
|---|---|---|---|
| EP | 1211630 | A2 | 6/2002 |
| JP | 1-182782 | | 7/1989 |
| JP | 3-063586 | | 3/1991 |
| JP | 2000284869 | A * | 10/2000 |
| JP | 2001-077878 | A | 3/2001 |
| JP | 2004-054542 | | 2/2004 |

* cited by examiner

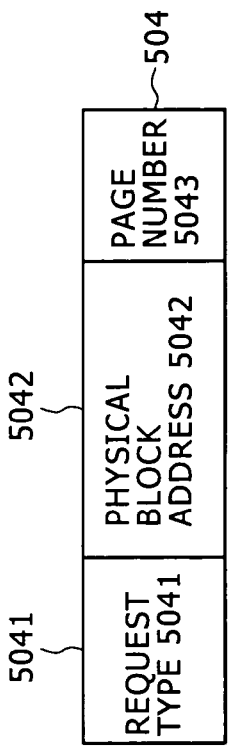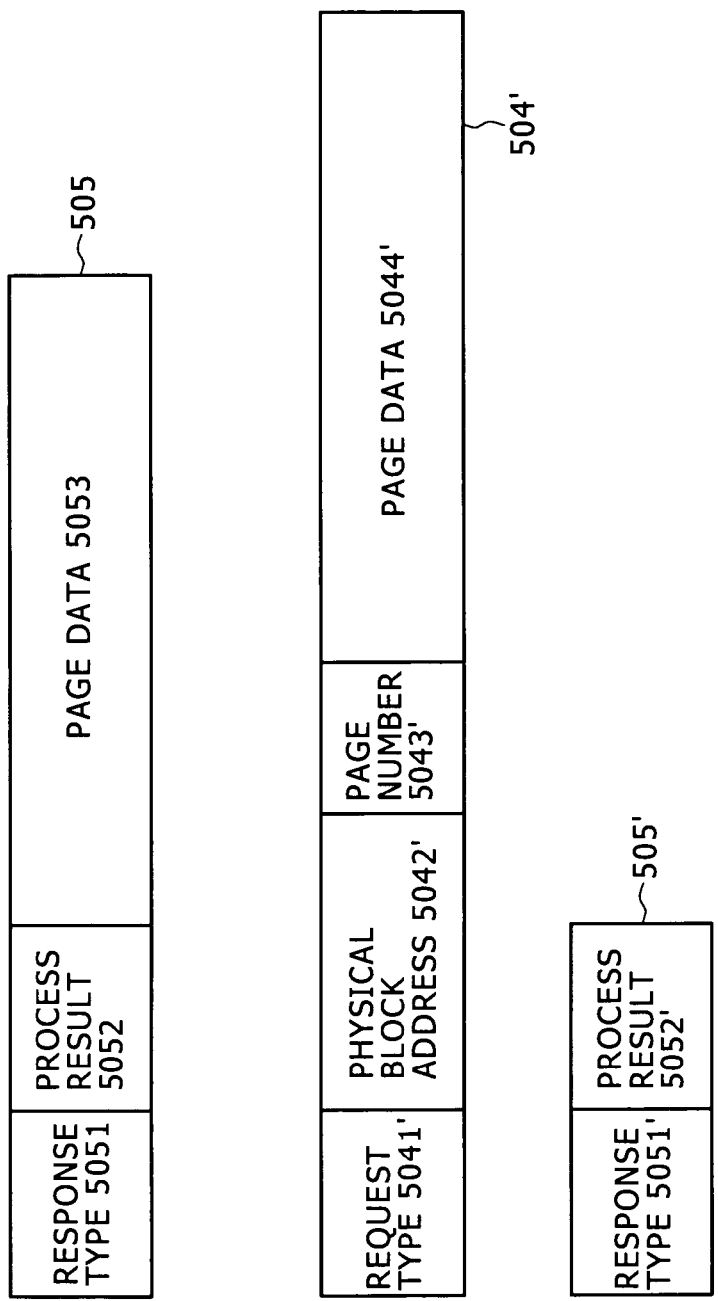
FIG. 7
FIG. 8

FIG.12

COMMAND (5)

| Type (1) | ID (1) | PHYSICAL BLOCK NUMBER (2) | PAGE NUMBER (1) |
|---|---|---|---|

RESPONSE (531)

| Type (1) | ID (1) | Rslt (1) | PAGE DATA 528 (528) |
|---|---|---|---|

FIG.13

COMMAND (5)

| Type (1) | ID (1) | PHYSICAL BLOCK NUMBER (2) | PAGE NUMBER (1) |
|---|---|---|---|

RESPONSE (1059)

| Type (1) | ID (1) | Rslt (1) | PAGE DATA 528 [1ST] (528) | PAGE DATA 528 [2ND] (528) |
|---|---|---|---|---|

FIG. 14

COMMAND (5)

| Type (1) | ID (1) | PHYSICAL BLOCK NUMBER (2) | PAGE NUMBER (1) |
|---|---|---|---|

RESPONSE (2115)

| Type (1) | ID (1) | Rslt (1) | PAGE DATA 528 [1ST] (528) | PAGE DATA 528 [2ND] (528) | PAGE DATA 528 [3RD] (528) | PAGE DATA 528 [4TH] (528) |
|---|---|---|---|---|---|---|

FIG.15

COMMAND (5)

| Type (1) | ID (1) | PHYSICAL BLOCK NUMBER (2) | PAGE NUMBER (1) |
|---|---|---|---|

RESPONSE (19)

| Type (1) | ID (1) | Rslt (1) | EXTENSION DATA (16) |
|---|---|---|---|

FIG.16

COMMAND (4)

| Type (1) | ID (1) | PHYSICAL BLOCK NUMBER (2) |
|---|---|---|

RESPONSE (515)

| Type (1) | ID (1) | Rslt (1) | PAGE 00h | PAGE 01h | EXTENSION DATA (16) x 32 PAGES (512) | PAGE 1Fh |
|---|---|---|---|---|---|---|

FIG.17

COMMAND (3)

| Type (1) | ID (1) | SEGMENT NUMBER (1) |
|---|---|---|

RESPONSE (1027)

| Type (1) | ID (1) | Rslt (1) | LOGICAL ADDRESS (2) x 512 (1024) |
|---|---|---|---|

FIG.18

COMMAND (533)

| Type (1) | ID (1) | PHYSICAL BLOCK NUMBER (2) | PAGE NUMBER (1) | 528 (528) |
|---|---|---|---|---|

RESPONSE (3)

| Type (1) | ID (1) | Rslt (1) |
|---|---|---|

FIG.19

COMMAND (21)

| Type (1) | ID (1) | PHYSICAL BLOCK NUMBER (2) | PAGE NUMBER (1) | EXTENSION DATA (16) |
|---|---|---|---|---|

RESPONSE (3)

| Type (1) | ID (1) | Rslt (1) |
|---|---|---|

FIG.20

COMMAND (4)

| Type (1) | ID (1) | PHYSICAL BLOCK NUMBER (2) |
|---|---|---|

RESPONSE (3)

| Type (1) | ID (1) | Rslt (1) |
|---|---|---|

COMMUNICATION SYSTEM, STORAGE DEVICE, AND CONTROL DEVICE FOR ACCESSING EXTERNAL FILE DATA ON A PAGE UNIT OR SECTOR UNIT BASIS

CROSS-REFERENCE TO RELATED APPLICATIONS

The present application claims priority from Japanese Patent Application No. JP 2004-334005 filed on Nov. 18, 2004, the disclosure of which is hereby incorporated by reference herein.

BACKGROUND OF THE INVENTION

The present invention relates to a communication system, a storage device, and a control device for externally accessing a storage area storing file data, and particularly to a communication system, a storage device, and a control device for accessing file data handled in a file unit in a storage area of the storage device connected via a radio communication section.

More particularly, the present invention relates to a communication system, a storage device, and a control device that do not increase a process load on a storage device side at a time of access to file data, and particularly to a communication system, a storage device, and a control device that require addition of fewer functions necessary for access to file data on a storage device side.

With recent technological innovation, various information devices handling computer files of various media such as text, images, audio and the like have been developed and commercially available, the information devices including a personal computer, a PDA (Personal Digital Assistant), a digital camera, a portable media player and the like. Many of the information devices of this type have a connector or an interface for detachably mounting a cartridge type memory device such as a built-in memory, a hard disk, a memory stick, a memory card, a USB (Universal Serial Bus) memory or the like.

For example, a digital camera encodes a picked-up image into a predetermined file format such as JPEG (Joint Photographic Experts Group) or MPEG (Moving Picture Experts Group), and then stores the image on a memory card. In such a case, many images, which cannot be stored in a low-capacity built-in memory, can be stored. When the memory becomes full, a new capacity for storing picked-up images can be obtained by replacing the memory card.

In addition, files of images captured on the digital camera can be transferred to another information device such as a personal computer or the like to be subjected to image processing such as image quality adjustment, re-encoding and the like, and the images can be managed in the form of a database, an album or the like. Alternatively, an image file is transferred to a printer and printed out so that the image file can be appreciated as a photograph.

In a common method for transferring images and other data on the memory card between devices, the memory card is extracted and then loaded into a device to which to transfer the data. Alternatively, data transmission from the device in which the memory card is loaded to the device to which to transfer the data can be made via a wire or wireless transmission line using a wired interface or a wireless interface. The latter radio communication, in particular, eliminates a need for the operation of reattaching a connector and routing a cable each time data is transmitted, thus providing great convenience.

FIG. 21 shows an example of image transmission by radio. In the figure, a digital camera is assumed as a mobile device. The digital camera stores picked-up images as image data in a built-in memory or an external memory card. In radio transmission, the digital camera reads desired image data from the built-in memory or the external memory card, and transfers the image data to image reproducing devices such as a personal computer, a television set, a printer and the like via a wireless interface. Of course, a wireless interface module is provided as an adapter in each of the receiving devices such as the personal computer, the television set, the printer and the like. After the transfer of the image data via a radio transmission line, the image data is displayed and stored by the personal computer, displayed on the screen of the television set, and printed out by the printer.

As described above, for radio transmission from the digital camera, a wireless interface module needs to be provided also on the transmission source device side. A device without a built-in wireless interface needs to be provided with a wireless interface by an external adapter. On the other hand, when a cartridge type storage device itself such as a memory stick or the like has a wireless interface module, the digital camera does not need to have a wireless interface module. In addition, without being attached to a data processing device proper such as the digital camera or the like, the memory stick can singly transmit data to a target device such as the personal computer, the printer or the like by radio.

An external memory medium having a radio communication function, for example, is proposed, for example, in Japanese Patent Laid-Open No. 2001-77878. This external memory medium includes a wire communication section for sending and receiving data to and from a host device into which the external memory medium is loaded via a physical connection section and a short-distance radio communication section for transmitting and receiving data to and from an external communication network via a short-distance radio communication network such as a Bluetooth communication network or the like. Hence, the host device having the external memory medium loaded therein can transmit and receive data to and from the communication network by driving the short-distance radio communication section within the memory medium.

FIG. 22 is a diagram showing a common example of configuration of an electronic device to which a storage device such as a hard disk, a flash memory or the like is applied. The electronic device 4 shown in FIG. 22 includes a storage unit 43 and a function controlling unit 41.

The storage unit 43 includes a storage device 431 formed by a storage medium such as a magnetic disk, a memory element or the like and a storage device controlling functional unit 432 for making physical access to the storage medium.

The storage device 431 corresponds to a physical storage area itself. The storage device controlling functional unit 432 is a controller that performs control on the storage device 431 for faulty block management, error detection, error correction and the like. The storage unit 43 is controlled by the device controlling unit 41 via a predetermined electric interface 42 such as a processor bus.

The device controlling unit 41 is a controller for centralized control of operation of the device as a whole, which controller is provided by a microcontroller or a CPU (Central Processing Unit). The device controlling unit 41 has a file controlling unit 411 and a data controlling unit 412. The device controlling unit 41 reads and writes file data from and to the storage unit 43.

The data controlling unit 412 is a driver controlling unit that reads and writes data in a minimum physical access unit (generally 512 bytes) referred to as a "sector" or a "page" from and to the storage unit 43.

The file controlling unit 411 is generally referred to as a "file system," and reads and writes file data, that is, data in a file unit from and to the storage unit 43 via the data controlling unit 412.

In related art, when the electronic device shares the data of the storage device with another device, a file system function and a data interface function (USB, IrDA, a wireless LAN or the like) are generally added to each device. FIG. 23 shows an example of configuration of the electronic device in such a case. The electronic device shown in FIG. 23 additionally includes an interface functional unit 44, and has an interface controlling unit 413 for driver control of the interface functional unit 44 in the device controlling unit 41.

However, a device configuration as shown in FIG. 23 has problems of an increase in a process load on the device controlling unit 41 and an increase in power consumption due to the addition of the data interface functional unit. In addition, a load of driver development and the like for function introduction is imposed on a developer.

SUMMARY OF THE INVENTION

It is desirable to provide an excellent communication system, an excellent storage device, and an excellent control device that make it possible to suitably access file data handled in a file unit in a storage area of the storage device connected via a radio communication section.

It is also desirable to provide an excellent communication system, an excellent storage device, and an excellent control device that do not increase a process load on a storage device side at a time of access to file data.

It is also desirable to provide an excellent communication system, an excellent storage device, and an excellent control device that require addition of fewer functions necessary for access to file data on a storage device side.

The present invention has been made in view of the above problems. According to an embodiment of the present invention, there is provided a communication system including a storage device having a storage area accessed in one of a page unit and a sector unit; a control device operable to request access to data in a file unit; and a predetermined transmission line for transmitting data between the storage device and the control device, wherein the control device transmits to the storage device via the transmission line a request for access to one of each page and each sector forming a file for which access has been requested, and the storage device sequentially accesses one of a requested page and a requested sector, whereby a request for access to the entire file is realized in the storage area.

The "system" in this case refers to a logical set of a plurality of devices (or functional modules for realizing specific functions), and whether each device or functional module is present within a single casing is not of particular concern (the same is hereinafter true).

Many information devices have a connector or an interface for detachably mounting a cartridge type memory device such as a hard disk, a memory stick, a memory card, a USB memory or the like. By having a short-distance radio communication section, the storage device of this type eliminates the need for the operation of reattaching a connector and routing a cable each time data is transmitted, thus providing great convenience.

The storage device according to the embodiment of the present invention has a radio communication section, and the external control device controls an operation for access to a storage unit via a radio transmission line, and a radio communication operation. Thus, without being attached to a data processing device proper, the storage device can singly transmit data to a target device such as a personal computer, a printer or the like by radio.

A communication functional unit for externally reading and writing file data in the storage area via radio communication is added to the storage device storing the file data via an electric interface. The control device having a similar communication functional unit controls the storage device via the radio communication. The control device controls the operation of reading and writing file data in the storage device.

In the storage area of the storage device side, an access operation is performed in a physical access unit referred to as a "page" in the case of a semiconductor storage device such as, for example, a flash memory, or a "sector" in the case of a disk type storage device such as, for example, a hard disk. On the other hand, on the control device side, as a data request source such as a personal computer or the like, data is managed under management of a file system of an OS, and a request for access to data is made in a file unit. For example, at a front end of the system, GUI operation by a user is performed on a file basis.

According to the embodiment of the present invention, the control device side converts a data request that occurs in a file unit into a request for each page, and sequentially makes a request for data in a page unit to the storage device via a radio communication section, whereby a request for data of the entire file is realized. In this case, data control on the storage area of the storage device, which control is performed by the control device via the radio communication section, is equivalent to direct file data reading and writing control on the storage device by the control device.

According to the embodiment of the present invention, it suffices for the storage device to respond to a request from the control device side for data in a physical access unit such as a page (or a sector) of the storage area instead of handling data in a file unit. Therefore, the process load involved in access operation for reading and writing file data is reduced on the storage device side, thus saving power. In addition, the storage device does not need to have a file system function and a data interface function, thus reducing cost. Further, the load of driver development and the like on a developer for function introduction is reduced.

The storage device according to the embodiment of the present invention performs, as radio communication with the control device, backscatter communication in which a reflected wave signal obtained by modulating a received reflected wave on the basis of transmission data is transmitted. This reflected wave transmission system allows reflected waves to be modulated by only switching operation, such as changing the load impedance of an antenna, or giving a phase difference on a reflected wave signal line, for example. Therefore, a data transmission line with a lower power consumption as compared with other radio communication systems can be realized.

When a request to read a file is made, the control device transmits to the storage device via the transmission line a request to read data in a page unit or a sector unit included in each block forming the file. In response to this request, the storage device reads page data or sector data requested to be read from a corresponding page or sector in the storage area, and returns the page data or the sector data to the control device via the transmission line. Then, the control device constructs the file requested to be read from the received data of each page or sector.

When a request to write a file is made, the control device transmits to the storage device via the transmission line a request to write data in a page unit or a sector unit included in each block forming the file. In response to this request, the storage device writes the page data or sector data requested to be written to a corresponding page or sector in the storage area.

In order to access a requested file in page units or sector units, the control device side needs to know correspondences between logical block address information and physical block address information.

Each page or sector in the storage area includes logical address information of data assigned to the page or sector. Hence, the control device requests logical address information of each page or sector from the storage device, and can generate address conversion information for blocks forming each file on the basis of the received logical address information. When a request for a file is generated, it suffices to generate requests for data in pages or sectors on the basis of the address conversion information.

According to an embodiment of the present invention, it is possible to provide an excellent communication system, an excellent storage device, and an excellent control device that make it possible to suitably access file data handled in a file unit in a storage area of the storage device connected via a radio communication section.

According to an embodiment of the present invention, it is also possible to provide an excellent communication system, an excellent storage device, and an excellent control device that do not increase the process load on the storage device side at the time of access to file data.

According to an embodiment of the present invention, it is also possible to provide an excellent communication system, an excellent storage device, and an excellent control device that require the addition of fewer functions necessary for access to file data on a storage device side.

In a communication system according to an embodiment of the present invention, radio communication using a reflected wave is performed between a storage device and a control device to transmit and receive file data. Since data control on the storage device is performed by the control device, function introduction to a device controlling unit for controlling the storage device is not required. In addition, the process load on the storage device side at the time of access to file data is not increased. The radio communication system using a reflected wave can reduce power consumption on the storage device side at the time of data transmission.

Other and further objects, features, and advantages of the present invention will become apparent from a more detailed description on the basis of the accompanying drawings and the embodiments of the present invention to be described later.

BRIEF DESCRIPTION OF THE DRAWINGS

FIG. 7 is a diagram showing an example of a data format for realizing a page read request 504 and a page read response 505;

FIG. 8 is a diagram showing an example of a data format for realizing a page write request 504';

FIG. 12 is a diagram showing the data format (READ_PAGE_DATA_528) of a control command and a response used for reading a total of 528 bytes of page data and extension data of a specified page in a specified physical block;

FIG. 13 is a diagram showing the data format (READ_PAGE_DATA_528×2) of a control command and a response used for reading page data and extension data (528 bytes) of each of two consecutive pages specified in a specified physical block;

FIG. 14 is a diagram showing the data format (READ_PAGE_DATA_528×4) of a control command and a response used for reading page data and extension data (528 bytes) of each of four consecutive pages specified in a specified physical block;

FIG. 15 is a diagram showing the data format (READ_EXTRA_DATA) of a control command and a response used for reading only extension data of 16 bytes of a specified page in a specified physical block;

FIG. 16 is a diagram showing the data format (READ_EXTRA_DATA_BLOCK) of a control command and a response used for en bloc reading of extension data of 16 bytes of each of all pages (that is, 32 pages) in a specified physical block;

FIG. 17 is a diagram showing the data format (READ_LOG_ADRS_SEGMENT) of a control command and a response used for en bloc reading of logical addresses of all pages (that is, 32 pages) in a specified physical block;

FIG. 18 is a diagram showing the data format (WRITE_PAGE_DATA_528) of a control command and a response used for writing a total of 528 bytes of page data and extension data to a specified page in a specified physical block;

FIG. 19 is a diagram showing the data format (WRITE_EXTRA_DATA) of a control command and a response used for writing only extension data of 16 bytes to a specified page in a specified physical block;

FIG. 20 is a diagram showing the data format (ERASE_BLOCK) of a control command and a response used for erasing a specified physical block;

DETAILED DESCRIPTION

Preferred embodiments of the present invention will hereinafter be explained in detail with reference to the drawings.

A communication system according to an embodiment of the present invention can function as a data transmission line for connection between a storage device storing file data and a control device requesting the file data. The embodiment of the present invention to be described below assumes a flash memory or a hard disk as the storage device. The embodiment of the present invention also assumes, as the control device, a personal computer that calls and writes file data in the storage device, and performs processes of for example file management, data reproduction, coding compression, and other data conversions and processing, or a display or a printer that displays or prints out data, or an external adapter or the like connected to these devices.

As the data transmission line for connection between the storage device and the control device, a reflected wave transmission system is applied in which an unmodulated carrier is transmitted from a reflected wave reader side and data communication is performed using reflected wave modulation based on for example an operation of changing antenna load impedance on a reflector side.

Lower power consumption can be realized by using reflected wave transmission as radio transmission. Lower power consumption can be realized particularly in a communication mode in which a ratio of transmission between devices limited to a relatively short distance accounts for most of communication therebetween. Image transmission with incomparably ultralow consumption can be realized by a mobile device, as compared with a wireless LAN, for example. The battery life of the mobile device can thereby be greatly lengthened.

In addition, by using reflected wave transmission as radio transmission, the cost of a radio transmission module of the mobile device as a data transmission side can be readily reduced as compared with a wireless LAN. Further, since the radio transmission module on the mobile side is not regarded as a radio station under a radio law, a need for authorization work such as conformity certification or the like is obviated.

Description in the following will be made of a method of configuration of the storage device and the control device, a communication system for reading/writing file data, and another method of configuration of the control device.

Figure 1:
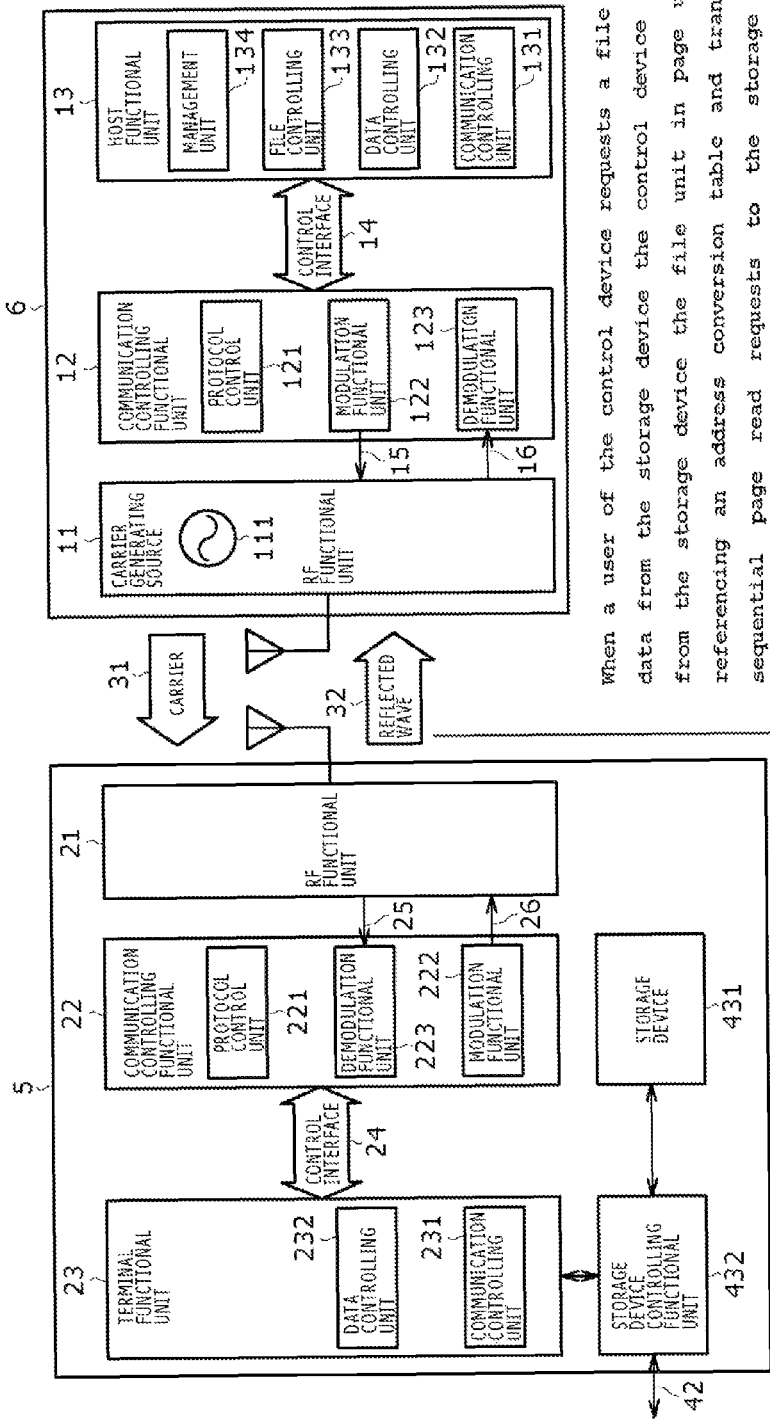
FIG. 1 is a diagram schematically showing a communication system according to an embodiment of the present invention.

FIG. 1 schematically shows a communication system according to an embodiment of the present invention. The communication system shown in FIG. 1 includes a storage device for storing file data and a control device for requesting file data and controlling the operation of accessing the file data. The storage device and the control device are connected to each other via a reflected wave transmission line as described above.

Figure 21:
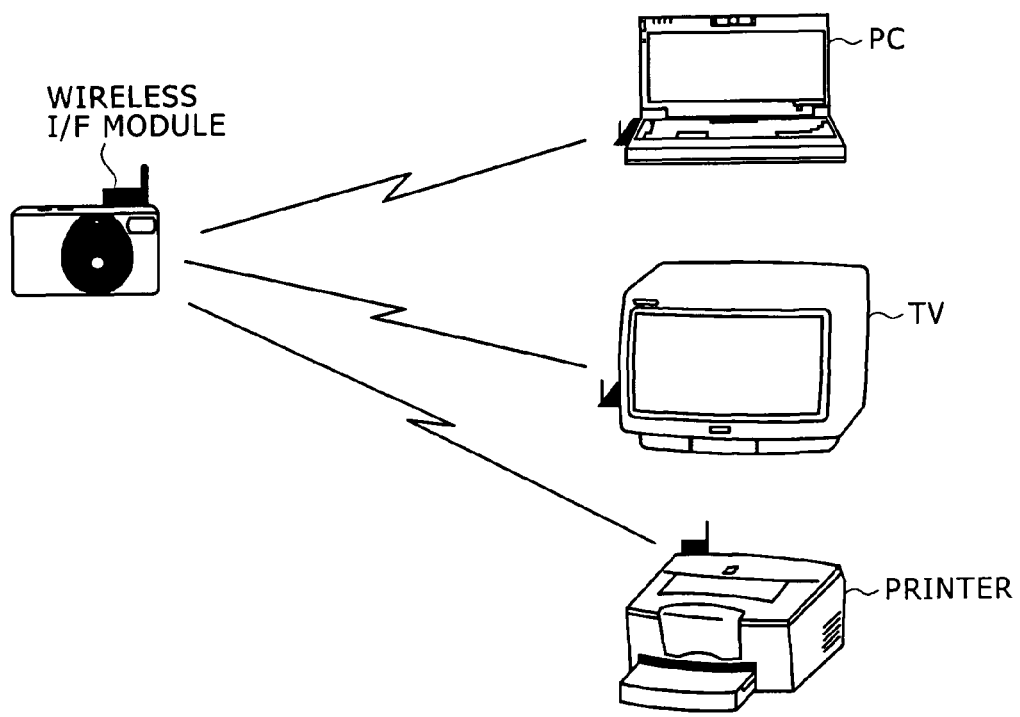
FIG. 21 is a diagram showing an example (example in related art) of image transmission by radio.
Figure 22:
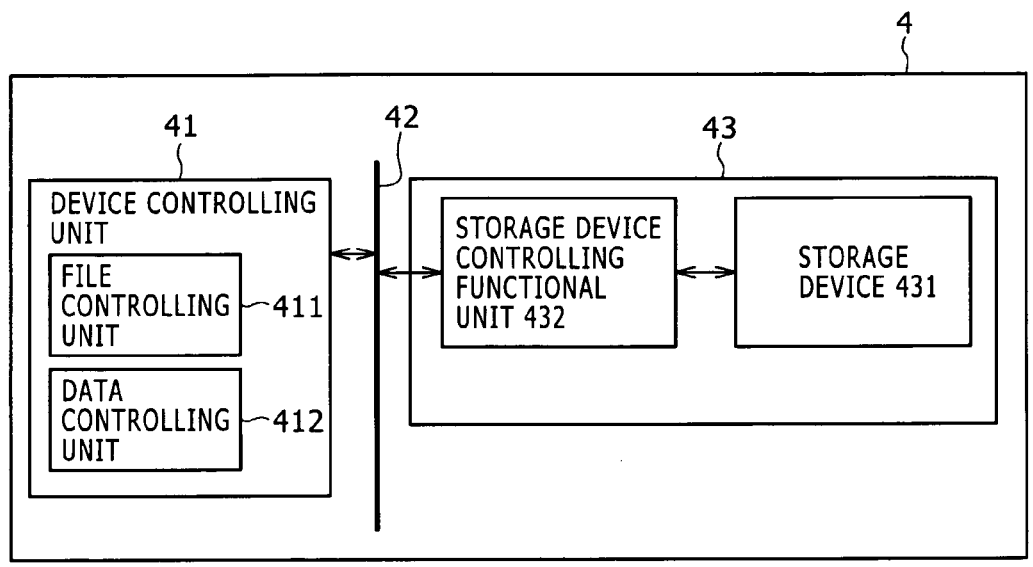
FIG. 22 is a diagram showing a common example (related art) of configuration of an electronic device to which a storage device such as a hard disk, a flash memory or the like is applied.
Figure 23:
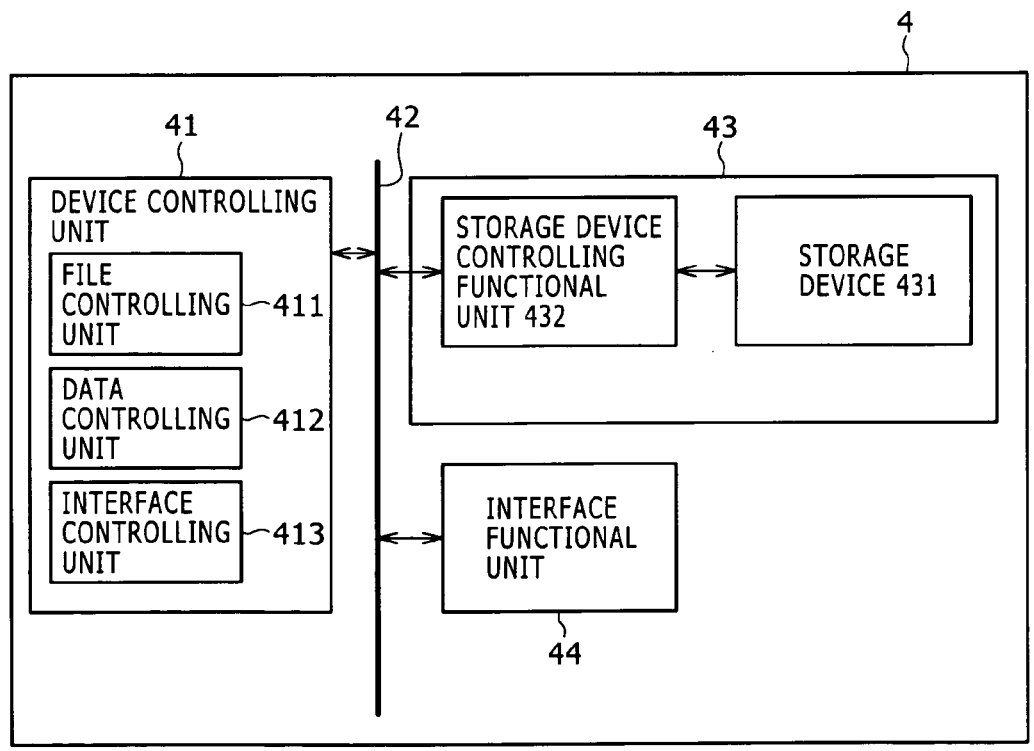
FIG. 23 is a diagram showing an example of configuration of an electronic device that shares data of a storage device with another device.

A storage device 431 and a storage device controlling functional unit 432 in the storage device 5 are similar to the functional modules provided with the same reference numerals in the storage device shown in FIG. 21. The storage device 5 is controlled by a device controlling unit via a predetermined electric interface 42, and can read and write file data. The storage device 5 also includes an RF functional unit 21 operating as a reflector in the above-described reflected wave transmission system, a communication controlling functional unit 22, and a terminal functional unit 23. The terminal functional unit 23 includes a communication controlling unit 231 and a data controlling unit 232.

The present embodiment assumes that the storage device 5 is the storage device 431 provided with a reflected wave data transmission function realized by the RF functional unit 21. However, the terminal functional unit 23 can be formed by a mobile type terminal device or the like as a transmission data supplying source, such for example as a digital camera, a video camera, a portable telephone, a portable information terminal, or a portable type music reproducing device.

The control device 6 includes an RF functional unit 11 operating as a reflected wave reader in the reflected wave transmission system, a communication controlling functional unit 12, and a host functional unit 13.

The host functional unit 13 is formed by a host device that processes or reproduces and outputs received data, such as a stationary electric household appliance including for example a television, a monitor, a printer, a personal computer, a VTR, and a DVD player. The host functional unit 13 in the example shown in FIG. 1 includes a communication controlling unit 131 controlling communication operation in the RF functional unit 11, a data controlling unit 132, a file controlling unit 133, and a management unit 134.

The data controlling unit 132 is a driver controlling unit that reads and writes data in a minimum physical access unit (generally 512 bytes) referred to as a "sector" or a "page" in the storage device 431. The file controlling unit 133 is generally referred to as a "file system," and reads and writes file data, that is, data in a file unit. The management unit 134 provides a user interface in the host functional unit 13 for a command input and the like from a user, and controls the operation of the whole of the host functional unit 13 in a centralized manner. The management unit 134 basically handles data in file units.

Data transmitted from the host functional unit 13 via a control interface 14 is subjected to modulation in a modulation functional unit 121 in the host communication controlling functional unit 12. A resulting modulating signal 15 is superimposed on an unmodulated carrier 31 generated by a carrier generating source 111 in the RF functional unit 11, and then transmitted to a terminal 2. ASK (Amplitude Shift Keying) modulation is generally used for a downlink from a host 1 to the terminal 2 in consideration of ease of detection on the terminal 2 side. The RF functional unit 21 of the terminal 2 receives the unmodulated carrier 31, and obtains a demodulation signal 25. The demodulation signal 25 is subjected to data demodulation by a demodulation functional unit 223, and then received by the terminal functional unit 23 via a control interface 24.

Data transmitted by the terminal functional unit 23 of the terminal 2 is subjected to modulation by a modulation functional unit 222 in the communication controlling functional unit 22. The RF functional unit 21 superimposes a modulating signal 26 on a reflected wave 32 obtained by detecting the unmodulated carrier 31, and then transmits the reflected wave 32 to the host 1. The RF functional unit 11 of the host 1 receives the reflected wave 32, and obtains a demodulation signal 16. The demodulation signal 16 is subjected to data demodulation by a demodulation functional unit 123, and then received by the host functional unit 13 via the control interface 14.

In addition to the above data transmitting and receiving functions, protocol functional units 121 and 221 that mutually function in the host 1 and the terminal 2 are provided in the respective communication controlling functional units 12 and 22, thereby realizing protocol control such for example as connection and disconnection in reflected wave communication between the control device 6 and the storage device 5.

Description will be made below of a reflected wave transmission system realized between the RF functional units 21 and 11 of the storage device 5 and the control device 6, respectively.

Figure 2:
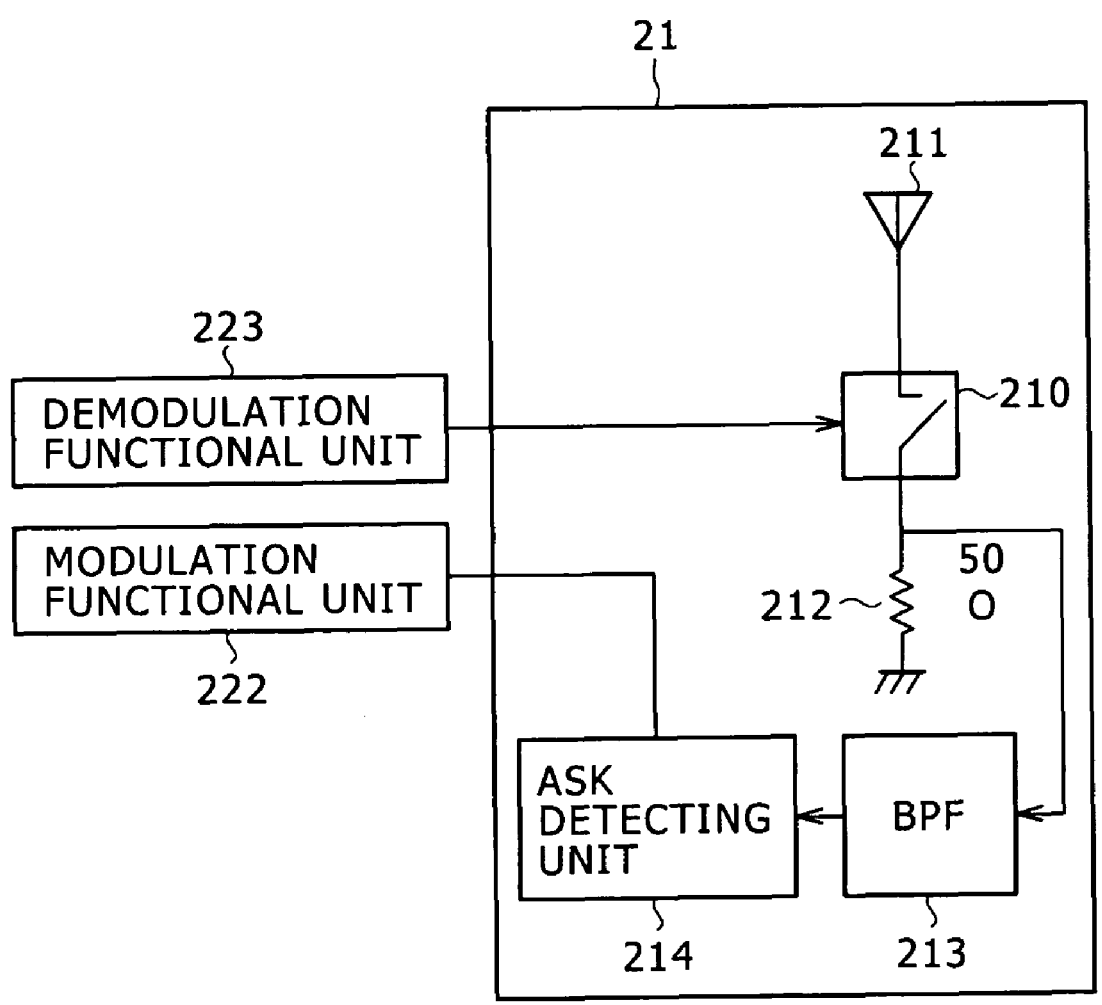
FIG. 2 is a diagram showing an internal configuration of an RF functional unit 21 on a storage device 5 side.

FIG. 2 shows an internal configuration of the RF functional unit 21 on the storage device 5 side.

The RF functional unit 21 as a reflector includes an antenna 211, an antenna switch 210, an antenna load 212, a band-pass filter 213, and an ASK detecting unit 214. In the present embodiment, a 2.4-GHz band referred to as an ISM band (Industrial, Scientific and Medical band) is used as radio wave frequencies.

When data transmission from the reflector side is performed, the RF functional unit 21 receives data read from the storage device 431 by the storage device controlling functional unit 432, and turns on/off the antenna switch 210 connected to the antenna 211 according to a bit image of the data. For example, when the data is 1, the antenna switch 210 is turned on, and when the data is 0, the antenna switch 210 is turned off.

As shown in the figure, when the antenna switch 210 is on, the antenna 211 is terminated by the antenna load 212 of $50\Omega$, and when the antenna switch 210 is off, the antenna 211 is open. This operation acts to terminate a carrier coming from a transfer destination when the antenna switch 210 is on, and reflect the carrier when the antenna switch 210 is off. Therefore, at the transfer destination, the reflected wave data can be read by detecting the reflection of the transmitted radio wave. That is, the transmission data is basically transmitted as the reflected wave of the radio wave from the transfer destination, the reflected wave being generated by variation in antenna load impedance which variation accompanies the on/off operation of the antenna switch 210. A reflected wave signal from the RF functional unit 21 is equivalent to an ASK modulated wave. However, in addition to ASK modulation, a PSK or an FSK modulation method is applicable in the reflected wave transmission system.

The antenna switch 210 is generally formed by a gallium arsenide IC, which consumes a power of a few 10 μW or lower. Thus, the above-described communication method makes it possible to achieve radio image transmission with an ultralow power consumption.

While the band-pass filter 213 and the ASK detecting unit 214 are used when receiving an ASK modulated delivery acknowledgement signal from the transfer destination, the two blocks are not required in one-way transmission without transmission delivery acknowledgement. When delivery acknowledgement is performed, on the other hand, control therefor is performed by the modulation functional unit 222.

The band-pass filter (BPF) 213 is used to pass signals of frequencies in the 2.4-GHz band and attenuate signals in other frequency bands. A power consumption of the ASK detecting unit 214 necessary when delivery acknowledgment is performed is 30 mW or less.

Hence, reflected wave data transmission from the storage device 5 to the control device 6 can be made with an average power of 10 mW or lower in the case of the delivery acknowledgment method, and with an average power of a few 10 μW in the case of the one-way transmission. This represents an overwhelming difference in performance as compared with an average power consumption of an ordinary wireless LAN.

Figure 3:
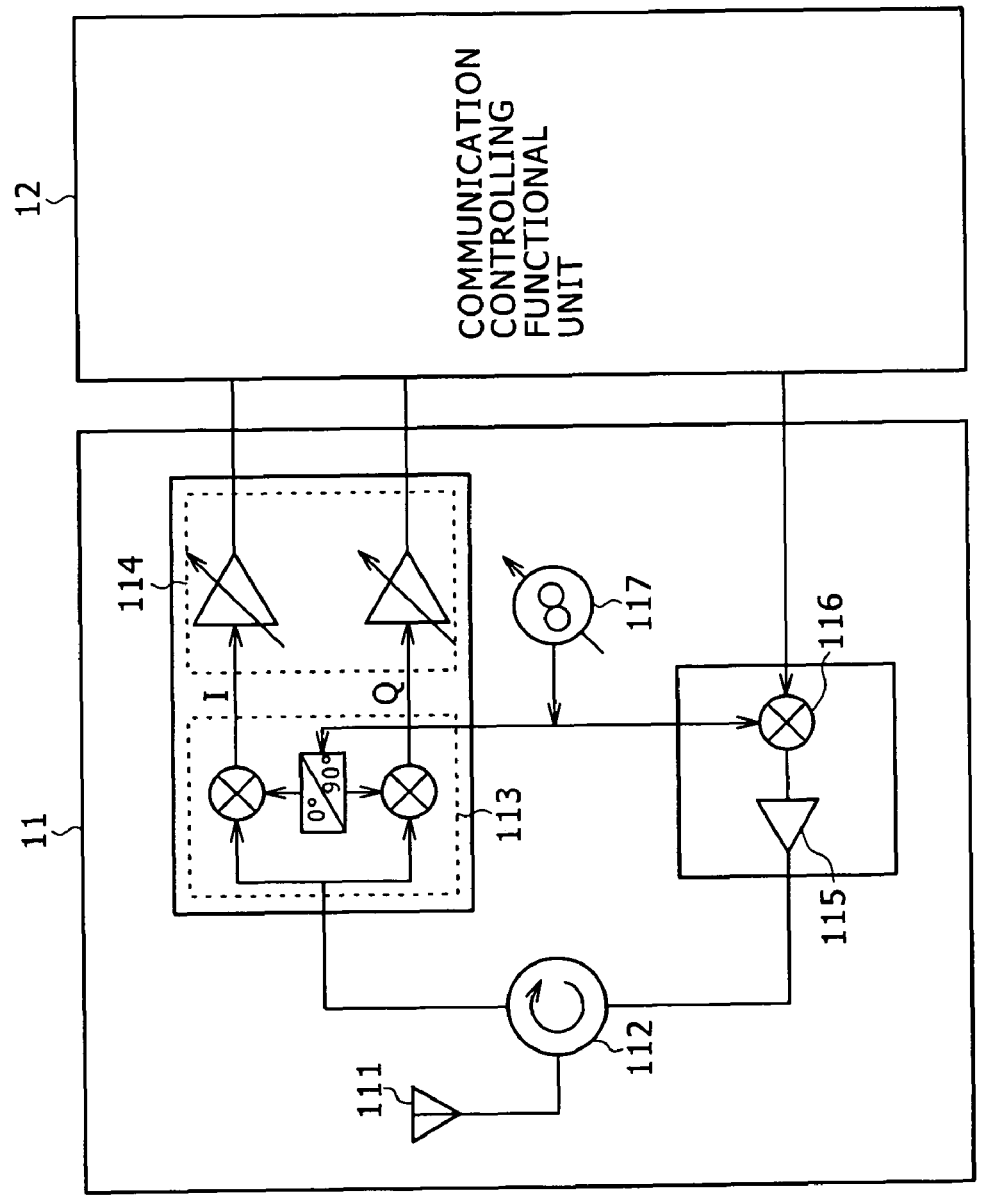
FIG. 3 is a diagram showing an internal configuration of an RF functional unit 11 on a control device 6 side.

FIG. 3 shows an internal configuration of the RF functional unit 11 on the control device 6 side.

Since transmission data from the storage device 5 is transmitted by a reflected wave, it is necessary to transmit an unmodulated carrier for creating the reflected wave from the control device 6. The RF functional unit 11 includes a 2.4-GHz band antenna 111, a circulator 112, a receiving unit including a quadrature detection unit 113 and an AGC amplifier 114, a transmitting unit including a mixer 115 and a power amplifier 116, and a frequency synthesizer 117.

The transmission of an unmodulated carrier from the transmitting unit is realized by supplying a direct-current voltage from the communication controlling functional unit 12 to the mixer 116. The frequency of the transmitted unmodulated carrier is determined by the frequency of the frequency synthesizer controlled by the communication controlling functional unit 12. The present embodiment uses the 2.4-GHz band referred to as the ISM band (same as above). The unmodulated carrier output from the mixer 116 is amplified to a predetermined level by the power amplifier 115, and then transmitted from the antenna 111 via the circulator 112.

A reflected wave from the RF functional unit 21 on the storage device 5 side has the same frequency as the unmodulated carrier transmitted from the RF functional unit 11 on the control device 6 side. The reflected wave is received by the antenna 111, and input to the above-mentioned receiving unit via the circulator 112. That is, since the same local frequency as in the transmission is input to the quadrature detection unit 113, an ASK modulating wave multiplied in the RF functional unit 21 as the reflector appears as output of the quadrature detection unit 113. However, since the received signal is different in phase from the local signal, modulating signals corresponding to the phase difference appear as an I-axis signal and a Q-axis signal.

The gain of the AGC amplifier 114 is controlled to an optimum value. The output signals of the AGC amplifier 114 are sent to the communication controlling functional unit 12. The communication controlling functional unit 12 demodulates digital data from the I-axis signal and the Q-axis signal. The correct data is further decoded, and then reconstructed as file data in the host functional unit (to be described later).

When acknowledging delivery of data from the storage device 5, the communication controlling functional unit 12 transfers to the mixer 116 digital data of a positive response ACK (Acknowledgement) when the received packet data is correct, or digital data of a negative response NACK (Negative Acknowledgement) when the received packet data has an error. The digital data is thus subjected to ASK modulation. Whether the data is correct or not is determined by CRC (Cyclic Redundancy Check) code added to the data packet transmitted by a reflected wave.

Figure 4:
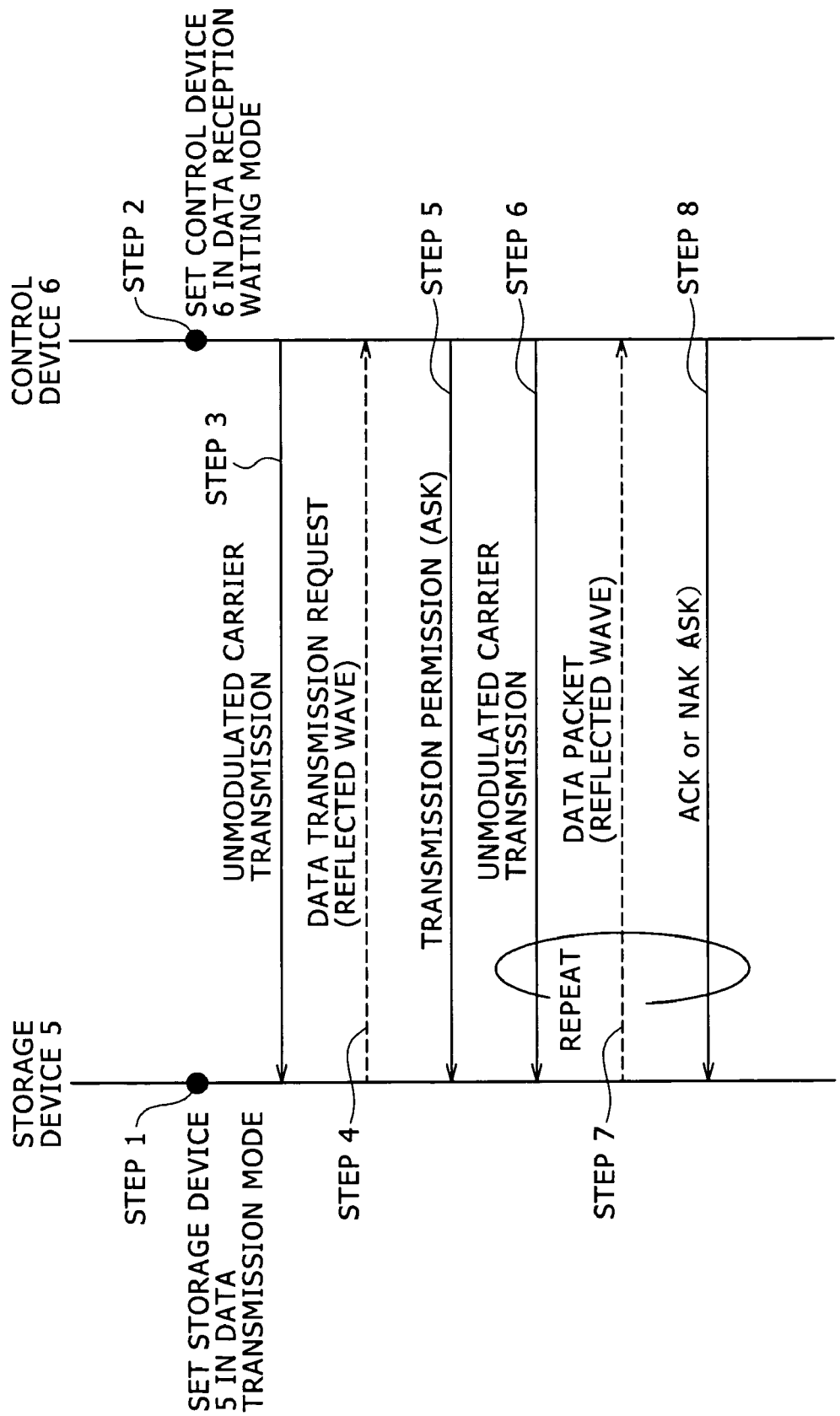
FIG. 4 is a diagram representing an example of a control sequence for making reflected wave transmission between the RF functional unit 21 on the storage device 5 side shown in FIG. 2 and the RF functional unit 11 on the control device 6 side shown in FIG. 3.

FIG. 4 represents an example of a control sequence for making reflected wave transmission between the RF functional unit 21 on the storage device 5 side shown in FIG. 2 and the RF functional unit 11 on the control device 6 side shown in FIG. 3. It is assumed in the example represented in FIG. 4 that delivery acknowledgement is performed between the devices. The control sequence will be described in the following.

(Step 1)
The storage device 5 is set in a radio communication mode for making reflected wave transmission.
(Step 2)
The control device 6 is set in a data reception waiting mode for receiving data transmitted by the reflected wave transmission.
(Step 3)
The control device 6 then transmits an unmodulated carrier to receive a reflected wave signal from the storage device 5.
(Step 4)
Receiving the unmodulated carrier, the RF functional unit 21 in the storage device 5 makes a data transmission request using a reflected wave.
(Step 5)
Receiving the data transmission request, the control device 6 transmits an ASK-modulated transmission permission.
(Step 6)
The control device 6 transmits an unmodulated carrier to receive data requested by the data transmission request.

(Step 7)

Receiving the unmodulated carrier, the RF functional unit 21 in the storage device 5 transmits packetized data using the modulation of a reflected wave.

(Step 8)

When the packet data received by the control device 6 is correct, the control device 6 transmits a positive response ACK (Acknowledgement) using ASK modulation. When the received packet data is incorrect, the control device 6 transmits a negative response NACK (Negative Acknowledgement). Whether the data is correct or not is determined by CRC (Cyclic Redundancy Check) code added to the data packet.

The communication system according to the present embodiment will be described referring to FIG. 1 again. In the communication system, file data access operation is performed between the host functional unit 13 in the control device 6 and the terminal functional unit 23 in the storage device 5, and the control device takes the initiative in controlling the operation.

The host functional unit 13 in the control device 6 includes the communication controlling unit 131, the data controlling unit 132, the file controlling unit 133, and the management unit 134. The terminal functional unit 23 in the storage device 5 includes the communication controlling unit 231 and the data controlling unit 232. Radio communication control is performed between the respective communication controlling units of the storage device 5 and the control device 6.

On the storage device 5 side, between the communication controlling unit 231 and the data controlling unit 232, access operation for reading and writing physical data in the storage device 431 is controlled in page units or sector units. The file controlling unit 133 in the control device 6 performs logical file system control for constructing data read and written by the data controlling unit 132 as file data.

Description will next be made of file system control performed mainly by the host functional unit 13 on the control device 6 side.

Figure 5:
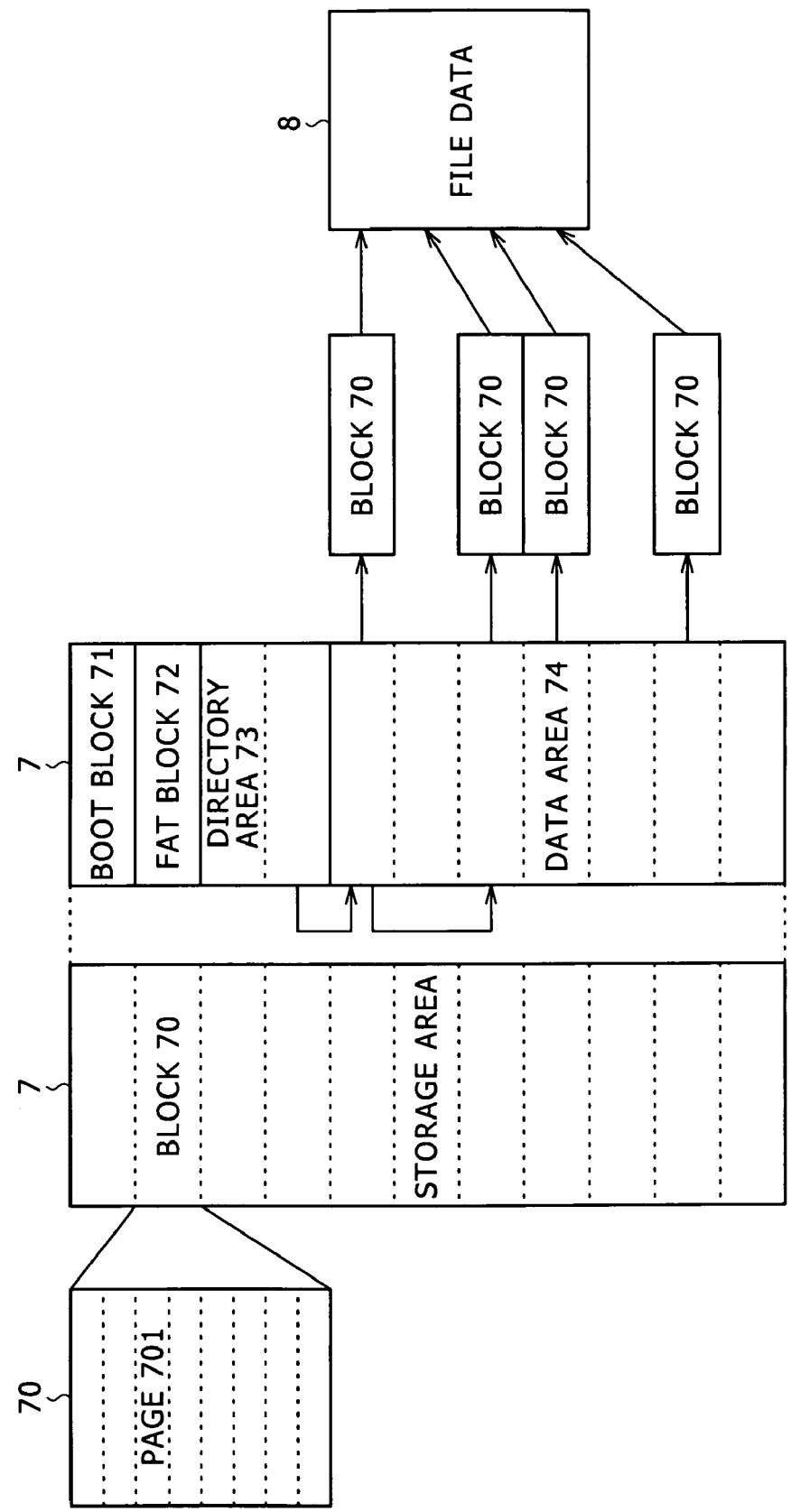
FIG. 5 is a diagram showing an example of structure of a storage area 7 and file data 8 in a case where a NAND type flash memory is assumed as a storage device 431.

FIG. 5 shows an example of structure of a storage area 7 and file data 8 in a case where a NAND type flash memory is assumed as the storage device 431.

A physical address space will first be described. A physical access unit in the storage area 7 is a 512-byte unit referred to as a page 701. However, when the storage device 431 is formed by a hard disk rather than a flash memory, the physical access unit is referred to as a "sector."

A set of a plurality of pages (generally 32 pages) in the storage area 7 forms a unit referred to as a block 71. The storage area 7 is physically divided into block units, and addresses of the storage area 7 are managed in block units. However, when the storage device 431 is formed by a hard disk, a set of a predetermined number of sectors forms a "cluster," and address management is performed in cluster units.

A logical address space will next be described. The storage area 7 is logically divided into a boot block 71, a FAT block 72, a directory area 73, and a data area 74 in block units. The boot block 71 stores information on the storage area as a whole. The FAT (File Allocation Table) block 72 stores address arrangement information of each block forming the file data (see for example http://home.impress.co.jp/magazine/dosvpr/q-a/0007/qa0007_2.htm). The directory area 73 stores directory information of all file data and first address information of each piece of file data. The data area 74 stores block data forming the file data.

The file controlling unit 133 in the host functional unit 13 requesting access to the file data obtains the boot block 71, and obtains the information of the directory area 73. Next, the first address information of the desired file data is obtained from the directory area 73. Next, address information of blocks forming the file data is obtained from the FAT block 72. The data controlling unit 132 obtains block data forming the file data, connects the block data, and thereby obtains the file data 8.

As described above, the control device 6 processes file data in block data units.

Figure 6:
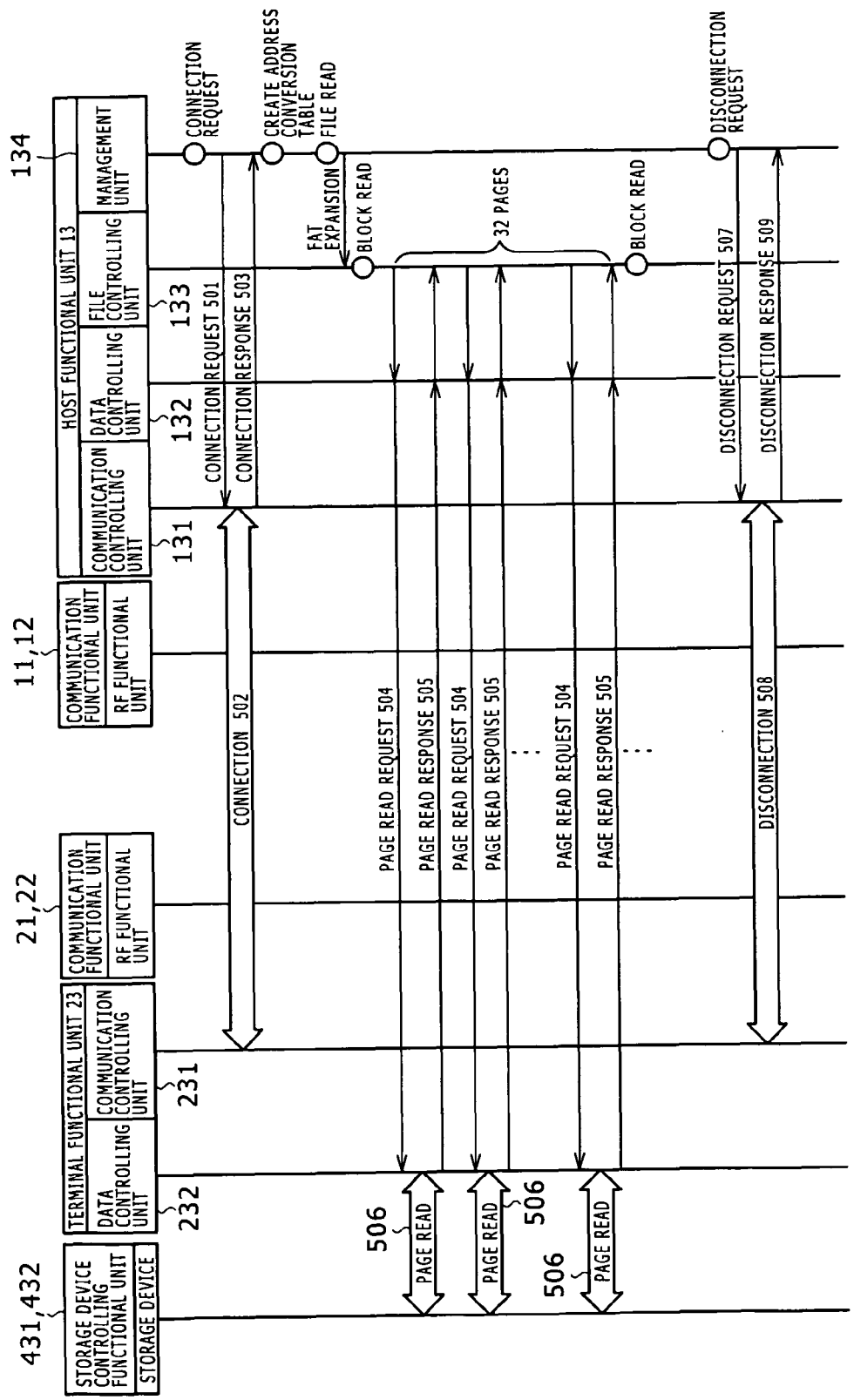
FIG. 6 is a diagram representing a process sequence for making reading access to file data in block data units between a host functional unit 13 on the control device 6 side and a terminal functional unit 23 on the storage device 5 side.

FIG. 6 represents a process sequence for making reading access to file data in block data units between the host functional unit 13 on the control device 6 side and the terminal functional unit 23 on the storage device 5 side.

The management unit 134 in the host functional unit 13 issues a connection request 501 to the communication controlling unit 131. The communication controlling unit 131 establishes a connection in a reflected wave transmission line between the communication controlling unit 131 and the communication controlling unit 231 in the terminal functional unit 23 via the communication controlling functional unit 12 and the RF functional unit 11 in the control device 6 and the RF functional unit 21 and the communication controlling functional unit 22 in the storage device 5 (502). A connection response 503 is returned from the communication controlling unit 131 to the management unit 134.

In order to access a requested file in page units or sector units, the control device 6 side needs to know correspondences between logical block address information and physical block address information. Each page within the storage device 431 includes logical address information of data assigned to the page (to be described later). Hence, the control device 6 requests logical address information of each page or sector from the storage device 5, and can generate an address conversion table for blocks forming each file on the basis of the received logical address information.

Next, the management unit 134 requests the file controlling unit 133 to read file data (file read). The file controlling unit 133 reads block data from the storage device 431 on the basis of the above-described file system control.

Access to the storage device 431 (for example a flash memory) is made in page units (described above). In the present embodiment, the control device 6 rather than the storage device 5 takes the initiative in reading file data from the storage device 431. The file controlling unit 133 therefore obtains data in page units, which are physical access units in accessing the storage device 431. For this, the file controlling unit 133 issues a page read request 504 via the data controlling unit 132. The file controlling unit 133 obtains a page read response 505 from the data controlling unit 232 in the storage device 5 that has obtained page data. The page number of a requested page can be obtained from the above-mentioned address conversion table.

Thus, when data in a file unit is requested, the control device 6 side requests data of each page forming the file instead of requesting the data in the file unit from the storage device 5. The control device 6 thus sequentially makes a request for data in a page unit to the storage device 5 via the reflected wave transmission line, and thereby realizes a request for the data of the entire file. Then, the file controlling unit 133 reconstructs the data obtained in page units into the original file. In this case, data control on the storage area of the storage device 5, which control is performed by the control device 6 via the reflected wave transmission line, is equivalent to direct file data reading and writing control on the storage device 5 by the control device 6.

According to the present embodiment, it suffices for the storage device 5 to respond to a request from the control device 6 side for data in a physical access unit such as a page (or a sector) of the storage area instead of handling data in a file unit. Therefore, a process load involved in access operation for reading and writing file data is reduced on the storage device 5 side, thus saving power. In addition, the storage device 5 does not need to have a file system function and a data interface function, thus reducing cost. Further, a load of driver development and the like on a developer for function introduction is reduced.

FIG. 7 shows an example of a data format for realizing the page read request 504 and the page read response 505. The page read request 504 and the page read response 505 are disposed as a payload in a data format in a radio communication section.

The page read request frame 504 includes a request type 5041, a physical block address 5042, and a page number 5043. The request type 5041 identifies a request content (for example whether the request is a reading request or a writing request). In this case, identifying information indicating a page data reading request is specified. The physical block address 5042 specifies the address of a physical block as a data reading source in the storage device 431. The page number 5043 specifies the number of a page to be obtained within the specified physical block. Incidentally, when consecutive pages are to be obtained within the same physical block, the number of pages to be obtained is described in the request type 5041, and the page number of a first page to be obtained is described in the page number 5043.

The page read response 505 includes a response type 5051, a process result 5052, and page data 5053. The response type 5051 identifies a response content, and describes the same identifying information as the request type 5041. The process result 5052 describes a process result indicating success or failure in obtaining page data from the storage device 431. The page data 5053 describes page data obtained from the page specified by the page number 5043 of the page read request 504.

FIG. 8 shows an example of a data format for realizing a page write request 504'. The page write request 504' is disposed as a payload in a data format in a radio communication section.

The page write request frame 504' includes a request type 5041', a physical block address 5042', a page number 5043', and page data 5044'. The request type 5041' identifies a request content (for example whether the request is a reading request or a writing request). In this case, identifying information indicating a page data writing request is specified. The physical block address 5042' specifies the address of a physical block as a data writing destination in the storage device 431. The page number 5043' specifies the number of a page as a writing destination within the specified physical block. Incidentally, when consecutive pages are to be written within the same physical block, the number of pages to be written is described in the request type 5041', and the page number of a first page to be written is described in the page number 5043'.

A page write response 505' includes a response type 5051' and a process result 5052'. The response type 5051' identifies a response content, and describes the same identifying information as the request type 5041'. The process result 5052' describes a process result indicating success or failure in writing page data to the storage device 431.

The operation of reading and writing page data units from the control device 6 to the storage device 5 is controlled by the above data control. The storage device 5 realizes block data control by performing control for a page data unit a plurality of consecutive times (32 times in the example represented in FIG. 6).

At this time, the storage device 5 requests data in a page unit as a physical access unit of the corresponding storage device 431 rather than requests data in a block unit. That is, block data is accessed by sequentially making a request for page data in the block. It suffices for the storage device 5 to respond to a request for data in a physical access unit of the storage device 431. Therefore, a process load involved in access operation is reduced. In addition, the storage device 5 does not need to have a file system function and a data interface function.

On the storage device 5 side, after file data control in the file controlling unit 133 is ended, the management unit 134 makes a request 507 for disconnecting the reflected wave transmission line to the communication controlling functional unit 131. The communication controlling functional unit 131 performs a disconnection control procedure 508 with the communication controlling functional unit 231 in the terminal functional unit 23. When the procedure is completed, the communication controlling unit 131 supplies a disconnection response 510 to the management unit 134.

Figure 9:
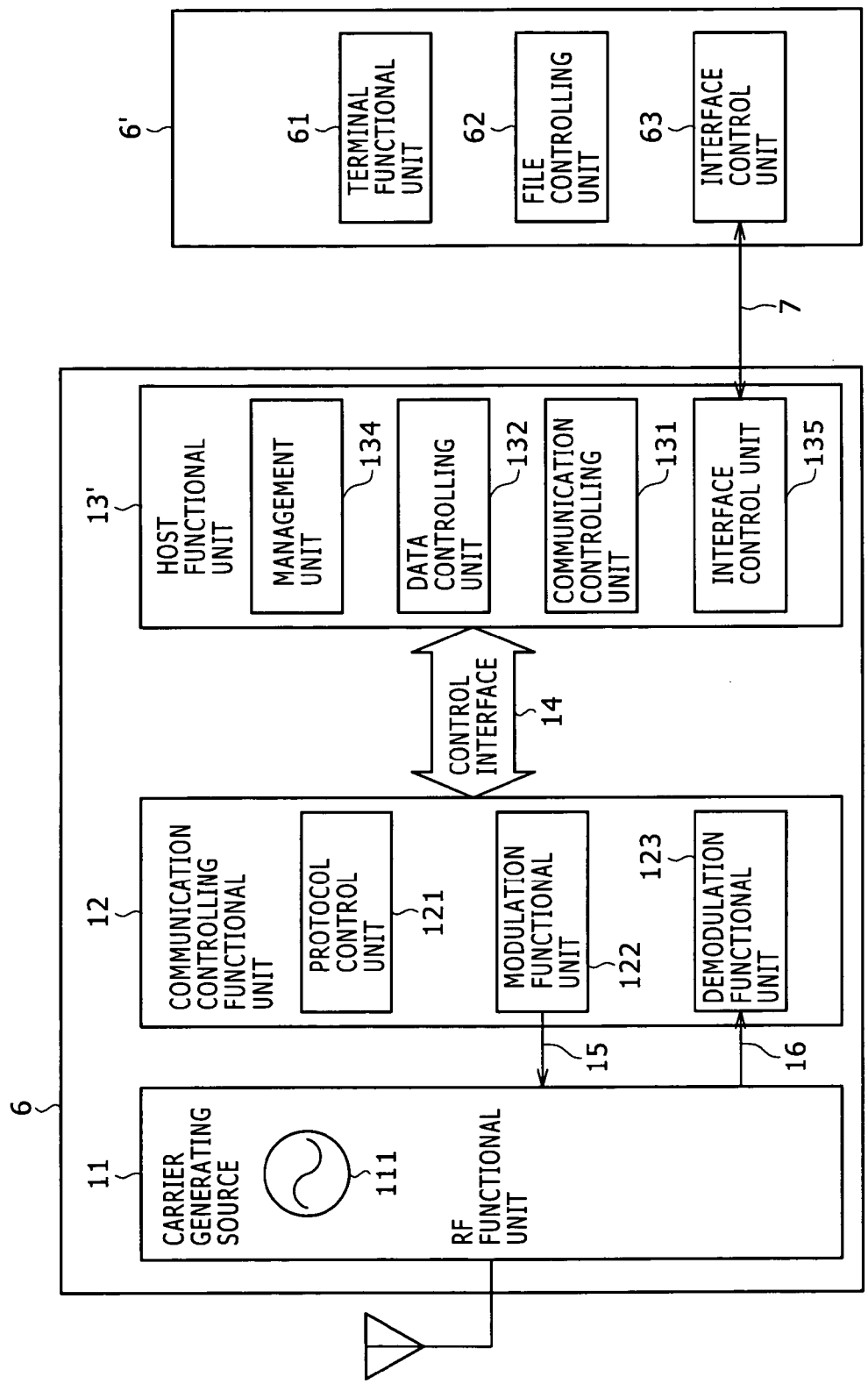
FIG. 9 is a diagram showing another example of configuration of the control device 6.

FIG. 9 shows another example of configuration of the control device 6. In the example of configuration shown in FIG. 9, a file control unit for controlling a file system is not disposed in the control device 6, but on the side of a control terminal 6' connected to the control device 6 via an external interface 7. The control device 6 and the control terminal 6' are connected to each other via a common interface control unit (135 and 63).

The control terminal 6' is formed by an information device that processes or reproduces and outputs received data, such as a stationary electric household appliance including for example a television, a monitor, a printer, a personal computer, a VTR, and a DVD player. The example shown in FIG. 9 shows that a control device 6 for requesting data from a storage device 5 having a reflector function can be externally connected as an adapter to a common information device of the above type.

When the control terminal 6' is a personal computer, for example, a general-purpose wired interface such for example as a USB (Universal Serial Bus) interface can be applied (of course, other wired interfaces or wireless interfaces may be applied). In the configuration shown in FIG. 9, an existing file system possessed by the personal computer can be used as a file controlling unit 133 as shown in FIG. 1. When a user operates a file, file control in the storage device 5 can be performed via file control software ("Explorer" in an operating system "Windows (registered trademark)" provided by Microsoft Corporation of the U.S.) on the personal computer.

Incidentally, a reflected wave transmission system generally employs a modulation method with a relatively low bit rate such as ASK or the like. For example, a signal 0 or 1 is disposed on a signal space by operating load impedance through for example on/off operation of termination of a directional antenna on a reflector side, whereby BPSK modulation is easily realized. However, these modulation methods have a problem in terms of transmission speed. On the other hand, for example, by providing a plurality of reflection paths having different phases from each other, and switching the reflection paths according to transmission data, it is possible to realize a phase modulation method with a higher bit rate, such as BPSK, QPSK, 8PSK modulation or the like. For example, the specification of Japanese Patent Laid-Open No. 2003-352223 already assigned to the present applicant discloses a communication system using a backscatter method incorporating a QPSK modulation process.

An embodiment of a communication system according to the present invention will hereinafter be described. In this case, a concrete example is assumed in which the communication system is formed with a flash memory module having a reflector and a control terminal having a reflected wave reader, and a flash memory is accessed via a reflected wave transmission line.

Figure 10:
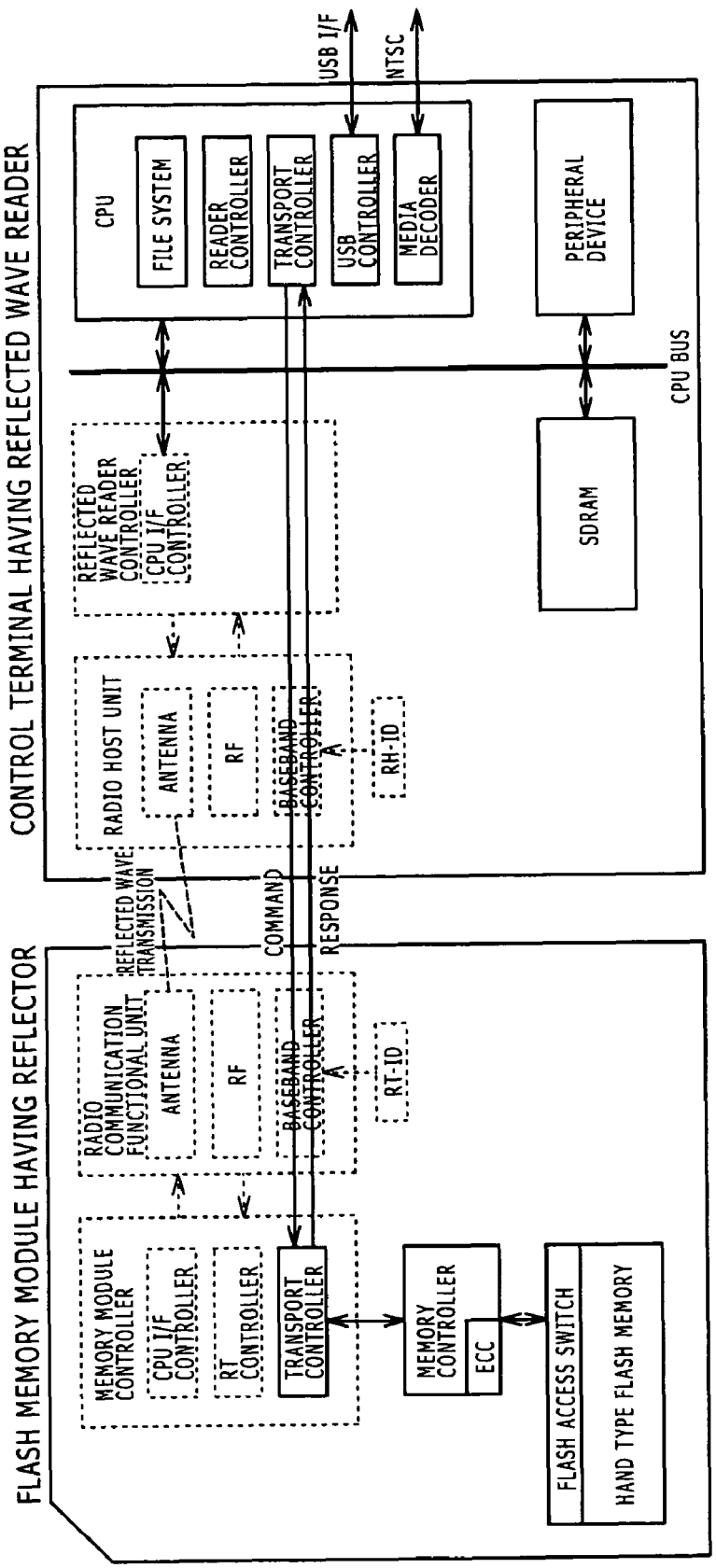
FIG. 10 is a diagram showing a configuration of a flash memory module having a reflector and a control terminal having a reflected wave reader.

FIG. 10 shows a configuration of a flash memory module having a reflector and a control terminal having a reflected wave reader.

The flash memory module having the reflector includes a memory controller for access from the reflected wave reader to the flash memory via the reflected wave transmission line independently of a memory module controller.

The control of the memory controller on the side of the flash memory module having the reflector by the reflected wave reader is realized in a command/response form. The data format of a control command input from the reflected wave reader and a response output from the flash memory module is specified as a transport specification in data link control.

In response to a control command, the memory controller reads or writes data in a page unit in a predetermined physical area of the flash memory via a page buffer (not shown). Then, a transport controller on the flash memory module side constructs response data corresponding to the control command, and transmits the response data to the reflected wave reader via the reflected wave transmission line.

Incidentally, a transport controller on the side of the control terminal having the reflected wave reader is implemented as a CPU control driver. A CPU constructs the control command, and outputs the data to a reflected wave reader controller. When receiving the response data from the flash memory module, the reflected wave reader controller obtains a control result and predetermined data.

Figure 11:
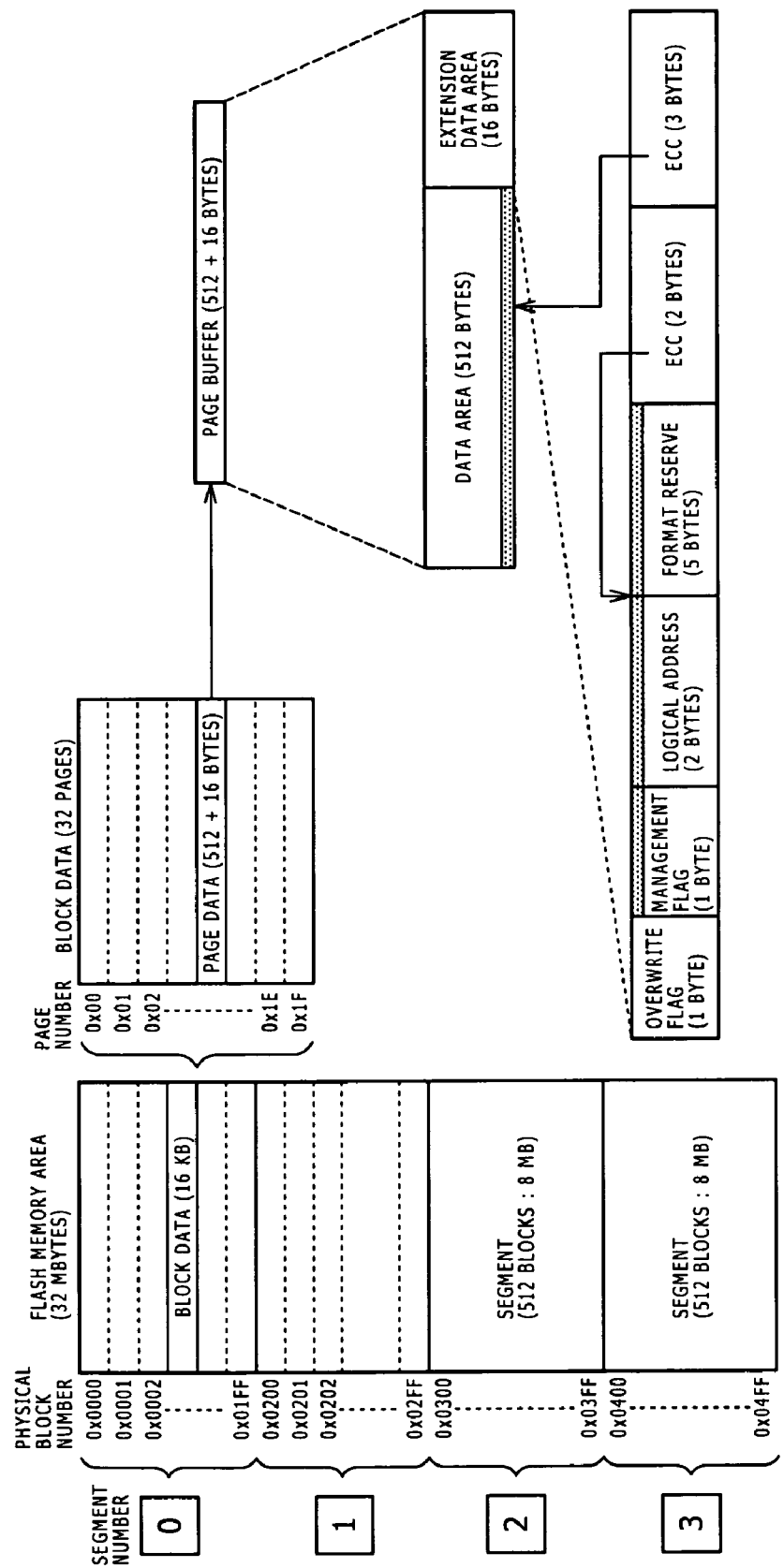
FIG. 11 is a diagram showing a physical format and a logical format of a flash memory as a storage device in the flash memory module having the reflector.

FIG. 11 shows a physical format and a logical format of the flash memory as a storage device in the flash memory module having the reflector.

Page data as a physical access unit of the flash memory is formed by a total of 528 bytes of a 512-byte data area and a 16-byte extension data area. Thus, the size of a page buffer used for access to the flash memory is 528 bytes.

The data area corresponds to a payload. The extension data area includes an overwrite flag, a management flag, the logical address of a physical block, a format reserve, and ECC (Error Correcting Code) for detecting and correcting an error in page data. The logical address in this area stores a logical address assigned to a corresponding physical page in a virtual space of a file system.

When the control terminal having the reflected wave reader establishes a connection with the flash memory module having the reflector on the reflected wave transmission line, the control terminal having the reflected wave reader does not know allocation information on allocation within the flash memory. Accordingly, the control terminal having the reflected wave reader makes an extension data area read request (to be described later) at the time of establishing the connection, and thereby obtains the logical address information of each page. The control terminal having the reflected wave reader can therefore generate an address conversion table.

One block is formed by every 32 pages (=16 kilobytes) in the flash memory. A block number is assigned to each block. A page number is assigned to each page in a block. Hence, a page can be requested by specifying a block number and a page number. Further, a segment is formed by every 512 blocks (8 megabytes). A segment number is assigned to each segment.

The control terminal having the reflected wave reader performs physical access control on the flash memory module having the reflector. Page data of 512 bytes and extension data of 16 bytes corresponding to a physical block number and a page number added to a control command are read or written via the page buffer.

Description will be made below of a control command used for physical access control on the flash memory module having the reflector and a response from the flash memory module having the reflector.

FIG. 12 shows the data format (READ_PAGE_DATA_528) of a control command and a response used for reading a total of 528 bytes of page data and extension data of a specified page in a specified physical block. The validity of the data is ensured by ECC. The following table describes the definition of each component in the data format shown in FIG. 12.

TABLE 1

| Component | LEN | Contents | Value |
| --- | --- | --- | --- |
| Application Type | 1 | Reflected Wave Transmission | 0x01 |
| Command/ Response ID | 1 | READ_PAGE_DATA_528 | 0x01 |
| Physical Block Number | 2 | Physical Block Number | 0x0000-0x07FF |
| Page Number | 1 | Page Number | 0x00-0x1F |
| Result | 1 | Bit[7:1]: Reason Bit[7:5]: TBD Bit[4:1]: Flash Controller Bit[0]: Status | TBD 0: Success, 1: Fail |
| Page Data 528 | 528 | Page Data (512) + Extra Data (16) | Big Endian, MSB 1st |

FIG. 13 shows the data format (READ_PAGE_DATA_528×2) of a control command and a response used for reading page data and extension data (528 bytes) of each of two consecutive pages specified in a specified physical block. The validity of the data is ensured by ECC. The following table describes the definition of each component in the data format shown in FIG. 13.

TABLE 2

| Component | LEN | Contents | Value |
| --- | --- | --- | --- |
| Application Type | 1 | Reflected Wave Transmission | 0x01 |
| Command/ Response ID | 1 | READ_PAGE_DATA_528 × 2 | 0x02 |
| Physical Block Number | 2 | Physical Block Number | 0x0000-0x07FF |
| Page Number | 1 | Page Number | 0x00-0x1E |
| Result | 1 | Bit[7:1]: Reason Bit[7:5]: TBD Bit[4:1]: Flash Controller Bit[0]: Status | TBD 0: Success, 1: Fail |
| Page Data 528 [1st] | 528 | Page Data (512) of First Page + Extra Data (16) | Big Endian, MSB 1st |
| Page Data 528 [2nd] | 528 | Page Data (512) of Second Page + Extra Data (16) | Big Endian, MSB 1st |

FIG. 14 shows the data format (READ_PAGE_DATA_528×4) of a control command and a response used for reading page data and extension data (528 bytes) of each of four consecutive pages specified in a specified physical block. The validity of the data is ensured by ECC. The following table describes the definition of each component in the data format shown in FIG. 14.

TABLE 3

| Component | LEN | Contents | Value |
|---|---|---|---|
| Application Type | 1 | Reflected Wave Transmission | 0x01 |
| Command/Response ID | 1 | READ_PAGE_DATA_528 × 4 | 0x03 |
| Physical Block Number | 2 | Physical Block Number | 0x0000-0x07FF |
| Page Number | 1 | Page Number | 0x00-0x1C |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Page Data 528 [1st] | 528 | Page Data (512) of First Page + Extra Data (16) | Big Endian, MSB 1st |
| Page Data 528 [2nd] | 528 | Page Data (512) of Second Page + Extra Data (16) | Big Endian, MSB 1st |
| Page Data 528 [3rd] | 528 | Page Data (512) of Third Page + Extra Data (16) | Big Endian, MSB 1st |
| Page Data 528 [4th] | 528 | Page Data (512) of Fourth Page + Extra Data (16) | Big Endian, MSB 1st |

FIG. 15 shows the data format (READ_EXTRA_DATA) of a control command and a response used for reading only extension data of 16 bytes of a specified page in a specified physical block. The validity of the data is ensured by ECC. The following table describes the definition of each component in the data format shown in FIG. 15.

TABLE 4

| Component | LEN | Contents | Value |
|---|---|---|---|
| Application Type | 1 | Reflected Wave Transmission | 0x01 |
| Command/Response ID | 1 | READ_Extra_DATA | 0x04 |
| Physical Block Number | 2 | Physical Block Number | 0x0000-0x07FF |
| Page Number | 1 | Page Number | 0x00-0x1F |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Extra Data | 16 | Extra Data (16) | Big Endian, MSB 1st |

FIG. 16 shows the data format (READ_EXTRA_DATA_BLOCK) of a control command and a response used for en bloc reading of extension data of 16 bytes of each of all pages (that is, 32 pages) in a specified physical block. The validity of the data is ensured by ECC. The following table describes the definition of each component in the data format shown in FIG. 16.

TABLE 5

| Component | LEN | Contents | Value |
|---|---|---|---|
| Application Type | 1 | Reflected Wave Transmission | 0x01 |
| Command/Response ID | 1 | READ_Extra_DATA_BLOCK | 0x05 |
| Physical Block Number | 2 | Physical Block Number | 0x0000-0x07FF |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Extra Data×32 | 512 | Connect Extra Data (16) of Pages 00 to 1F | Big Endian, MSB 1st |

FIG. 17 shows the data format (READ_LOG_ADRS_SEGMENT) of a control command and a response used for en bloc reading of logical addresses of all pages (that is, 32 pages) in a specified physical block. The validity of the data is ensured by ECC. The following table describes the definition of each component in the data format shown in FIG. 17.

TABLE 6

| Component | LEN | Contents | Value |
|---|---|---|---|
| Application Type | 1 | Reflected Wave Transmission | 0x01 |
| Command/Response ID | 1 | READ_LOG_ADRS_SEGMENT | 0x06 |
| Physical Block Number | 2 | Segment Number | 0x03-0x0F (32-128) |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Logical Address × 512 | 1024 | Connect Logical Addresses of Extra Data in Increasing Order of Block Number | Big Endian, MSB 1st |

When the control terminal having the reflected wave reader establishes a connection with the flash memory module having the reflector on the reflected wave transmission line, the control terminal having the reflected wave reader does not know allocation information on allocation within the flash memory, and needs to generate an address conversion table. Accordingly, the control terminal having the reflected wave reader issues this request command READ_LOG_ADRS_SEGMENT to read logical addresses en bloc at the time of establishing the connection, and thereby obtains the logical address information of each page. On the basis of this information, the control terminal having the reflected wave reader can easily generate an address conversion table.

FIG. 18 shows the data format (WRITE_PAGE_DATA_528) of a control command and a response used for writing a total of 528 bytes of page data and extension data to a specified page in a specified physical-block. The validity of the data is ensured by ECC. The following table describes the definition of each component in the data format shown in FIG. 18.

TABLE 7

| Component | LEN | Contents | Value |
|---|---|---|---|
| Application Type | 1 | Reflected Wave Transmission | 0x01 |
| Command/Response ID | 1 | WRITE_PAGE_DATA_528 | 0x07 |
| Physical Block Number | 2 | Physical Block Number | 0x0000-0x07FF |
| Page Number | 1 | Page Number | 0x00-0x1F |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Page Data 528 | 528 | Page Data (512) + Extra Data (16) | Big Endian, MSB 1st |

FIG. 19 shows the data format (WRITE_EXTRA_DATA) of a control command and a response used for writing only extension data of 16 bytes to a specified page in a specified physical block. The validity of the data is ensured by ECC. The following table describes the definition of each component in the data format shown in FIG. 19.

TABLE 8

| Component | LEN | Contents | Value |
|---|---|---|---|
| Application Type | 1 | Reflected Wave Transmission | 0x01 |
| Command/Response ID | 1 | WRITE_Extra_DATA | 0x08 |
| Physical Block Number | 2 | Physical Block Number | 0x0000-0x07FF |
| Page Number | 1 | Page Number | 0x00-0x1F |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |
| Extra Data | 16 | Extra Data (16) | Big Endian, MSB 1st |

FIG. 20 shows the data format (ERASE_BLOCK) of a control command and a response used for erasing a specified physical block. The following table describes the definition of each component in the data format shown in FIG. 20.

TABLE 9

| Component | LEN | Contents | Value |
|---|---|---|---|
| Application Type | 1 | Reflected Wave Transmission | 0x01 |
| Command/Response ID | 1 | ERASE_BLOCK | 0x09 |
| Physical Block Number | 2 | Physical Block Number | 0x0000-0x07FF |
| Result | 1 | Bit[7:1]: Reason<br>Bit[7:5]: TBD<br>Bit[4:1]: Flash Controller<br>Bit[0]: Status | TBD<br><br><br>0: Success, 1: Fail |

The present invention has been explained above in detail with reference to specific embodiments thereof. It is obvious, however, that modifications and substitutions in the embodiments may be made by those skilled in the art without departing from the spirit of the present invention.

While in the present specification, the present invention has been described centering on embodiments in which a reflected wave transmission system is used as the data transmission line for connection between the storage device storing file data and the control device requesting the file data, the subject matter of the present invention is not limited to this. For example, even when a radio communication system other than a reflected wave transmission system, or a USB or another wire communication system is applied, similar effects of the present invention can be produced in that a process load on the storage device side at the time of access to file data is not increased and added functions necessary for access to file data on the storage device side are fewer.

In short, the present invention has been disclosed in a form that is illustrative and contents described in the present specification are not to be construed in a restrictive manner. In order to determine the spirit of the present invention, claims are to be considered.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication system, comprising:
   a storage device having a storage area accessed in one of a page unit and a sector unit;
   a control device operable to request access to data in a file unit and being wirelessly coupled to the storage device; and
   a predetermined transmission line for transmitting data between the storage device and the control device,
   the control device requests logical address information of each page unit or sector unit of the storage device and generates an address conversion table for blocks forming each file unit on the basis of the received logical address information,
   wherein when a user of the control device requests a file unit of data from the storage device the control device requests from the storage device the file unit in page units by referencing the address conversion table and transmitting sequential page read requests to the storage device, receives respective page read responses from the storage device, and constructs the file unit from the received page read responses,
   each page read request including a request type, a physical block address, and a page number, and each page read response including a response type, a process result, and page data.

2. The communication system as claimed in claim 1, wherein the storage area is formed by one of a flash memory in which physical access is made in a page unit and a hard disk in which physical access is made in a sector unit.

3. The communication system as claimed in claim 1, wherein
   the storage device includes a reflector for performing data communication using reflected wave modulation of a received unmodulated signal based on one of operation of changing antenna load impedance and a phase difference given on a reflection line of the signal, the control device includes a reflected wave reader for demodulating the modulated reflected wave signal, and reflected wave data transmission is performed on the transmission line.

4. The communication system as claimed in claim 1, wherein when a request to read a file is made, the control device transmits to the storage device via the transmission line a request to read data in one of a page unit and a sector unit included in each block forming the file, the storage device reads one of page data and sector data requested to be read from one of a corresponding page and a corresponding sector in the storage area, and returns the data to the control device via the transmission line, and the control device constructs the file requested to be read from received data of one of each page and each sector.

5. The communication system as claimed in claim 1, wherein when a request to write a file is made, the control device transmits to the storage device via the transmission line a request to write data in one of a page unit and a sector unit included in each block forming the file, and the storage device writes one of page data and sector data requested to be written to one of a corresponding page and a corresponding sector in the storage area.

6. A control device for controlling access to data in a storage device that is wirelessly coupled to the control device and which has a storage area accessed in one of a page unit and a sector unit via a predetermined transmission line, said control device comprising:

file controlling means for managing data in a file unit;

data controlling means for controlling access to data in one of a page unit and a sector unit;

communicating means for transmitting data on the transmission line; and communication controlling means for controlling communication operation of the communicating means;

the control device requests logical address information of each page unit or sector unit of the storage device and generates an address conversion table for blocks forming each file unit on the basis of the received logical address information, wherein when a user of the control device requests a file unit of data from the storage device the control device requests from the storage device the file unit in page units by referencing the address conversion table and transmitting sequential page read requests to the storage device, receives respective page read responses from the storage device, and constructs the file unit from the received page read responses, each page read request including a request type, a physical block address, and a page number, and each page read response including a response type, a process result, and page data.

7. A storage device, comprising:

a storage area accessed in one of a page unit and a sector unit;

a communicating section for transmitting data via a predetermined transmission line; and an access controlling section for controlling access to the storage area, the request to access the storage area being received from a control device that is wirelessly coupled to the storage device;

the control device requests logical address information of each page unit or sector unit of the storage device and generates an address conversion table for blocks forming one or more file units on the basis of the received logical address information, wherein when a user of the control device requests a file unit of data from the storage device the control device requests from the storage device the file unit in page units by referencing the address conversion table and transmitting sequential page read requests to the storage device, receives respective page read responses from the storage device, and constructs the file unit from the received page read responses, each page read request including a request type, a physical block address, and a page number, and each page read response including a response type, a process result, and page data.

8. The storage device as claimed in claim 7, wherein the storage area is formed by one of a flash memory in which physical access is made in a page unit and a hard disk in which physical access is made in a sector unit.

9. The storage device as claimed in claim 7, wherein the communicating section includes a reflector for performing data communication using reflected wave modulation of a received unmodulated signal based on one of operation of changing antenna load impedance and a phase difference given on a reflection line of the signal, and reflected wave data transmission is performed on the transmission line.

10. The storage device as claimed in claim 7, wherein the access controlling section reads one of page data and sector data requested to be read from one of a corresponding page and a corresponding sector in the storage area, and returns the data to an access request source via the transmission line.

11. The storage device as claimed in claim 7, wherein the access controlling section writes one of page data and sector data requested to be written to one of a corresponding page and a corresponding sector in the storage area.

12. A control device for controlling access to data in a storage device that is wirelessly coupled to the control device and which has a storage area accessed in one of a page unit and a sector unit via a predetermined transmission line, said control device comprising:

a file controlling section for managing data in a file unit;

a data controlling section for controlling access to data in one of a page unit and a sector unit;

a communicating section for transmitting data on the transmission line; and a communication controlling section for controlling communication operation of the communicating section;

the control device requests logical address information of each page unit or sector unit of the storage device and generates an address conversion table for blocks forming each file unit on the basis of the received logical address information, wherein when a user of the control device requests a file unit of data from the storage device the control device requests from the storage device the file unit in page units by referencing the address conversion table and transmitting sequential page read requests to the storage device, receives respective page read responses from the storage device, and constructs the file unit from the received page read responses, each page read request including a request type, a physical block address, and a page number, and each page read response including a response type, a process result, and page data.

13. The control device as claimed in claim 12, wherein the storage area is formed by one of a flash memory in which physical access is made in a page unit and a hard disk in which physical access is made in a sector unit.

14. The control device as claimed in claim 12, wherein the communicating section includes a reflected wave reader for transmitting an unmodulated signal, and for receiving a reflected wave signal resulting from modulation of the unmodulated signal based on one of operation of changing antenna load impedance and a phase difference given on a reflection line of the signal, and reflected wave data transmission is performed on the transmission line.

15. The control device as claimed in claim 12, wherein when a request to read a file is made, the data controlling section transmits to the storage device via the transmission line a request to read data in one of a page unit and a sector unit included in each block forming the file, and constructs the file requested to be read from received data of one of each page and each sector.

16. The control device as claimed in claim 12, wherein when a request to write a file is made, the data controlling section transmits to the storage device via the transmission line a request to write data in one of a page unit and a sector unit included in each block forming the file.

* * * * *